United States Patent [19]

Fujii et al.

[11] 4,445,124

[45] Apr. 24, 1984

[54] INK JET RECORDING PROCESS

[75] Inventors: Tadashi Fujii, Yokohama; Tomoyuki Yamaguchi, Chiba, both of Japan

[73] Assignee: Ricoh Co., Ltd., Tokyo, Japan

[21] Appl. No.: 375,527

[22] Filed: May 6, 1982

[30] Foreign Application Priority Data

May 15, 1981 [JP] Japan .................................. 56-72932

[51] Int. Cl.3 .............................................. G01D 15/18

[52] U.S. Cl. ........................................ 346/75; 346/1.1

[58] Field of Search ................... 346/1.1, 75; 210/681, 210/684, 685

[56] References Cited

U.S. PATENT DOCUMENTS

| | | | |
|---|---|---|---|
| 4,007,684 | 2/1977 | Takano et al. | 346/75 X |
| 4,153,902 | 5/1979 | Kanayama | 346/75 X |
| 4,176,056 | 11/1979 | Grier | 210/684 X |
| 4,197,391 | 4/1980 | Uejima et al. | 210/684 X |
| 4,349,442 | 9/1982 | Barraque et al. | 210/681 X |

*Primary Examiner*—George H. Miller, Jr.

*Attorney, Agent, or Firm*—Flynn, Thiel, Boutell & Tanis

[57] ABSTRACT

An ink jet recording process comprising jetting aqueous ink through a narrow nozzle, recovering the unused aqueous ink that has not reached the surface of an object to be recorded within an ink jet printer and then circulating it for re-use, characterized in that said aqueous ink is brought into contact with an ion-exchange resin in at least one location in the ink circulating system within said printer.

15 Claims, 4 Drawing Figures

INK JET RECORDING PROCESS

BACKGROUND OF THE INVENTION (a) Field of the Invention

The present invention relates to an ink jet recording process, in particular to an ink jet recording process devised so that an aqueous ink circulating within an ink jet printer is brought into contact with an ion-exchange resin and thus recording is ensured for a long period of time without causing clogging of ink at a narrow nozzle (the fore end portion of an ink jet head).

(b) Description of the Prior Art

The so-called ink jet recording process, which comprises jetting a liquid ink (a water-soluble dye-containing ink for use in ink jet recording) through a narrow nozzle (namely, a discharge nozzle) so as to have ink particles charged while flying about, and attaching said ink particles selectively on the surface of a given recording paper (paper to be recorded) using a control electrode, has been put to practical use in the field of facsimile machines, the output printers of electronic calculators and the like.

This ink jet recording process is surely advantageous in the points: (1) high speed recording is possible, (2) the object to be recorded can include various articles such as common paper, plastic sheet, cloth and others, (3) color recording is possible, and so forth, but on the other hand it is defective in that a complete counterplan has not been considered yet for overcoming the clogging phenomenon of the narrow nozzle and consequently long-run recording can not be ensured.

Specifically, when this ink jet recording system is run for a long period of time such as 1000 hours or more or is stopped for a long period of time, there occurs clogging of ink at the fore end of the narrow nozzle so that the direction and quantity of ink jetted become unstable and further the size and flying speed of ink drops (ink particles) vary exceedingly, whereby it becomes impossible to obtain a clear-cut record and jet printing is hampered according to circumstances.

It is known to provide a plurality of small-mesh filters in the ink circulation system for the purpose of preventing the above mentioned clogging at the narrow nozzle portion (Japanese Patent Publication No. 19746/1980). However, this design encounters another problem that the filters clog so as to shorten their lives. The use of a composite filter, which comprises placing a surface filter and a depth filter one over the other, can somewhat prolong the filter's life but there is a limit in this. Accordingly, this means should be said insufficient to work out a substantial solution to said problem.

Japanese Laid Open Patent Application No. 85804/1976 has proposed a method of preventing the occurrence of clogging at the narrow nozzle portion which comprises incorporating a chelating reagent in ink so as to dissolve the metallic compounds present in the ink. But, this brings about an undesirable situation that said chelating reagent-containing ink contacts with metal parts of the ink circulating system, thereby accelerating corrosion of said metal parts.

Further, Japanese Laid Open Patent Application No. 120007/1979 has proposed an expedient of further adding a rust preventive to the chelating reagent-containing ink so as to prevent corrosion of the above mentioned metal parts. However, this expedient is surely serviceable for preventing the corrosion of said metal parts merely to some degree, but still has a limit in the prevention of corrosion. Accordingly, this should also be said insufficient to provide a substantial solution thereto. In addition, this expedient can be observed to include such a disadvantage that when the ink jet recording system is stopped for a long period of time, the rust preventive precipitates and deposits at the fore end portion of the nozzle, whereby the jetting direction of ink is sometimes changed widely.

SUMMARY OF THE INVENTION

The inventors have investigated the reason why the above mentioned clogging of the narrow nozzle portion is caused from various angles and discovered that said clogging phenomenon becomes marked as the concentration of ink rises due to evaporation of the water contained in the ink, in particular the dust present in the air (especially, metals and metal oxides contained in the dust) comes to enter the circulating ink. It was further discovered that these metals and metal oxides can be readily absorbed on an ion-exchange resin and removed. The present invention has been completed on the basis of the discovery as mentioned above.

The present invention aims at the provision of an ink jet recording process which is free from clogging of the narrow nozzle portion even over a long period of continuous circulatory injection or a long period of downtime of the process and therefore can maintain the stable jetting direction and quantity of ink and can achieve the uniform size and flying speed of ink drops.

In other words, the ink jet recording process according to the present invention comprises jetting aqueous ink through a narrow nozzle, recovering the unused aqueous ink that has not reached the surface of an object to be recorded within an ink jet printer and then circulating it for re-use, characterized in that said aqueous ink is brought into contact with an ion-exchange resin in at least one place of the ink circulating system within said printer.

In this connection, it is to be noted that the term "circulating of ink" used herein intends to include both of the cases wherein the ink jetted through the narrow nozzle is recovered within the apparatus without leaving the apparatus and wherein the ink jetted through the narrow nozzle is recovered within the apparatus after leaving the apparatus. Accordingly, it may be determined optionally whether the ion-exchange resin and ink should contact at a place within the apparatus (ink jet printer) or they should contact at a place out of the apparatus.

DETAILED DESCRIPTION OF THE PREFERRED EMBODIMENTS

Figure 1:
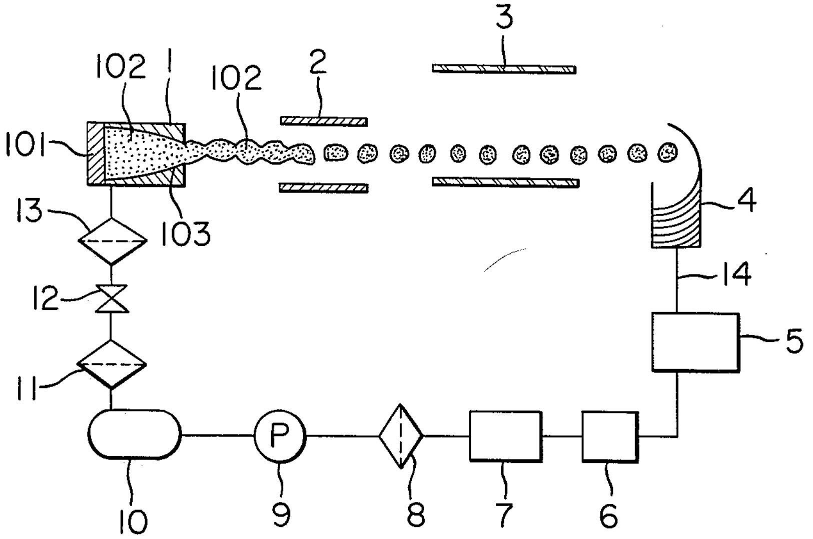
FIG. 1 is a view illustrating one embodiment of the ink circulating system of the ink jet recording process according to the present invention.

The present invention will be described in more detail with reference to the accompanying drawing hereinafter. FIG. 1 is a diagrammatic view illustrating the representative example of the ink circulating system employed in the ink jet recording process (ink jet recording system) according to the present invention, wherein reference numeral 1 denotes an ink jet head, 2 denotes a charged electrode, 3 denotes a deflection electrode, 4 denotes a collector, at least one of 5 and 6 denotes an ion-exchange resin packed tank and when only one of 5 and 6 is an ion-exchange resin packed tank, the other is a 20–200 μm-mesh coarse filter (a first filter), 7 denotes an ink tank, 8 denotes a 3–20 μm-mesh filter (which is a second filter when either of the above 5 and 6 is a first filter and a first filter when both of 5 and 6 are ion-exchange resin packed tanks), 9 denotes a liquid feed pump, 10 denotes an air chamber, 11 denotes a 0.1–2 μm-mesh filter (which is a third filter when either of the above 5 and 6 is a first filter and a second filter when both are ion-exchange resin charged tanks), 12 denotes a valve, 13 denotes a 1–20 μm-mesh filter (which a fourth filter when either of the above 5 and 6 is a first filter and a third filter when both are ion-exchange resin packed tanks, 14 denotes a tube, 101 denotes an electrostriction vibrator, 102 denotes the ink within the ink jet head liquid chamber, 103 denotes a narrow nozzle, 102' denotes an ink column, and 102'' denotes an ink drop.

Figure 2:
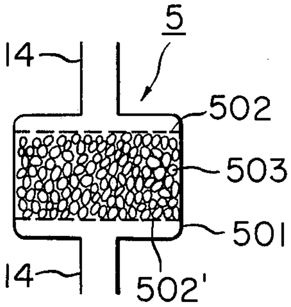
FIGS. 2 to 4 are views illustrating three embodiments of the ion-exchange resin packed tank used in the present invention respectively.
Figure 3:
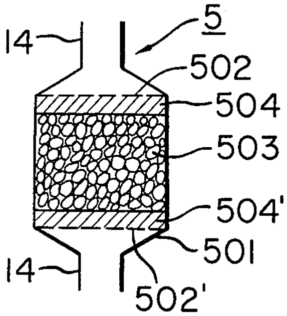
Figure 4:
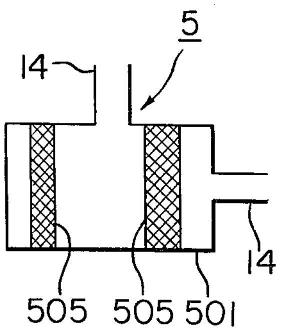

FIG. 2 to FIG. 4 illustrate three examples of the ion-exchange resin packed tank (5 and/or 6). For convenience' sake, explanation will be made with reference to the ion-exchange resin packed tank 5 alone.

FIG. 2 illustrates the ion-exchange resin packed tank 5 constructed so that an ion-exchange resin particle column 503, interposed between two perforated plates, is accommodated within a container body 501 whose upper and lower portions have been connected to a tube 14 along which the ink flows. On the other hand, FIG. 3 illustrates the ion-exchange resin packed tank 5 constructed so that an ion-exchange resin particle column 503, interposed between perforated plates 502 (502') and quartz fiber columns 504 (504') disposed on the upper and lower sides and placed one upon another respectively, is accommodated within a container body 501 whose upper and lower portions have been connected to a tube 14.

In this connection, it is to be noted that although FIG. 2 and FIG. 3 happen to depict the tube 14 orientated from upward to downward relative to the container body 501, the apparatus as depicted in FIGS. 2 and 3 may be incorporated horizontally in the ink circulating system. And, these ion-exchange resin packed tanks 5 each may be constructed so as to incorporate the whole as depicted in FIG. 2 or FIG. 3 in an outer case that has connected to the tube 14, has at least the inside emptied and has provided at the side with an opening and shutting door or a sliding door. This facilitates exchange of the ion-exchange resin or regeneration of the removed ion-exchange resin. In this instance, however, it is necessary that an entrance and exit of ink should be situated as well as possible to the end of the tube 14.

FIG. 4 shows that a tube 14 is connected to a container body 501 making a right angle, this container body incorporates for instance a cylindrical filter case 505 therein, and said filter case accommodates therein an ion-exchange resin particle column. This ion-exchange resin packed tank illustrated in FIG. 4 may also be devised so as to facilitate the removal and packing of ion-exchange resin as described above.

The ion-exchange resin packed tank (5 and/or 6) may be located at an optional place within the ink circulating system. However, it is most preferable that said tank should be located at a place just after the ink has been discharged (or jetted) and recovered in the collector 4 or at a place just after the ink has been recovered in the collector 4 and treated once by means of a course 10–200 μm-mesh filter. This is because it is profitable to adsorption-remove the dust in air, especially metals or metal compounds brought in the ink, early in the ink circulating system.

The aqueous ink used in the process according to the present invention may be one comprising a water soluble dye (basic dye, metal complex dye, mordant dye, acid dye, direct dye, reactive dye, dye developing color on substrate, vat color, sulfur color, and the like). As the particularly preferable dyes, in this instance, there can be enumerated the water soluble acid dye and water soluble direct dye. These dyes are used singly or in a combination of two kinds or more.

As the typical water soluble acid dyes there can be enumerated the following ones:

C.I. Acid Yellow: 7, 36, 44, 99
C.I. Acid Red: 83, 133
C.I. Acid Violet: 7, 11, 34, 41, 43, 51, 63
C.I. Acid Blue: 22, 23, 25, 27, 29, 40, 41, 43, 45, 59, 62, 74, 78, 80, 92, 93, 100, 102, 113, 120, 123, 127, 138
C.I. Acid Green: 12, 19, 20, 25, 27, 36, 41, 44
C.I. Acid Brown: 2, 4, 13, 27, 103
C.I. Acid Black: 1, 2, 7, 24, 26, 31, 48, 94

As the typical water soluble direct dyes there can be enumerated the following ones:

C.I. Direct Yellow: 33, 39, 44, 50
C.I. Direct Orange: 10, 26, 29, 39, 41, 49, 102
C.I. Direct Red: 2, 4, 13, 17, 23, 24, 28, 31, 33, 46, 62, 63, 75, 79, 80, 83, 84, 113, 229
C.I. Direct Blue: 1, 2, 6, 15, 22, 41, 71, 76, 78, 98, 106, 120, 158, 163, 165
C.I. Direct Black: 2, 4, 17, 19, 22, 32, 38, 51, 56, 71, 74, 77, 154

Known additives may be added to this aqueous ink on occasion. In more detail, as said additives there can be optionally employed glycol, glycol ether, glycol ether ester, amine or the like as a wetting agent; water soluble resins such as polyvinyl alcohol, polyvinyl pyrrolidone, carboxymethyl cellulose sodium salt, methyl cellulose, water soluble acryl resin or the like or high molecular electrolytes as a fixing agent and viscosity improver; and additionally substances known as regulator of surface tension, regulator of pH, regulator of resistivity, dye dissolving agent, antiseptics and the like For instance, as the regulator of surface tension used suitably in the present invention there can be enumerated anionic, cationic and nonionic surface active agents. In the concrete, the anionic surface active agents include polyethylene glycol ether sulfuric acid, ester salt and the like, the cationic surface active agents include poly-2-vinylpyridine derivatives and poly-4-vinylpyridine derivatives, and the nonionic surface active agents include polyoxyethylene alkyl ether, polyoxyethylene alkylphenyl ether, polyoxyethylene alkyl ester, polyoxyethylene sorbitan monoalkyl ester, polyoxyethylene alkyl amine and the like. In addition to these surface active agents, there can be effectively used amine acids such as diethanolamine, propanolamine, morpholine and the like, basic substances such as ammonium hydroxide, sodium hydroxide and the like, and substituted pyrrolidones such as N-methyl-2-pyrrolidone and the like.

If needed, these regulators of surface tension may be used in a combination of two kinds or more so as to prepare an aqueous ink having a desired surface tension value, so far as it does not exert a bad influence on each other or other components.

Although the quantities of these regulators of surface tension added are determined suitably depending on the kinds, the other components contained in an aqueous ink to be prepared and the recording characteristics required therefor, it is preferable that said quantities should normally be in the range of 0.0001–0.1 part by weight, more preferably in the range of 0.001–0.01 part by weight per part by weight of said aqueous ink.

Specifically, the regulators of pH used in the present invention include lower alkanolamines, for instance, such as monovalent hydoxides of alkali metal hydroxides and the like, ammonium hydroxide and the like.

This regulator of pH is added in a required quantity so that the aqueous ink to be prepared may have a desired pH value.

The regulator of pH is added in a proper quantity so that the aqueous ink to be prepared may have a fixed pH value sufficient to protect the chemical stability of the aqueous ink, in other words to prevent change in physical properties and precipitation or aggregation of the recording agent (dye) and other components of the aqueous ink during long period of storage.

As the regulator of pH there can be suitably used almost any one which is able to control the pH of the aqueous ink into a desired value without exerting a bad influence on the aqueous ink.

Specifically, as the regulator of resistivity there can be enumerated inorganic salts such as ammonium chloride, sodium chloride, potassium chloride and the like, water soluble amines such as triethanolamine and the like, quaternary ammonium salt and the like. In this connection, it is to be noted that in the case of recording where it is needless to charge aqueous ink drops, the resistivity value of the aqueous ink may be determined optionally.

Although the impurity contained in the circulating ink is considered to be consisted essentially of the dust in air as referred to previously, the components of the dust are not necessarily clarified. However, as stated previously, it has been confirmed that at least metals and metal compounds are present therein. In view of this, any exchange resin of cation, anion or dipolar type is applicable to the process according to the present invention. Among them, however, the cation exchange resin is especially preferable, of which the acid cation exchange resin (more preferably strong acid one) and chelating resin are preferably used in this instance.

As the cation exchange resin there can be enumerated those whose high molecular composition-made matrixes are of the phenol-type, styrene-type, acryl-type, acrylic acid-type and pyridine-type. As the acidic group with ion-exchange capacity there can be enumerated sulfonic acid group (—$SO_3M_1$), carboxyl group (—$COOM_1$) and phenolic hydroxyl group (—$OM_1$), and additionally phosphonic acid group (—$PO_3H_2$), arsonic acid group (—$AsO_3H_2$) and the like, wherein $M_1$ is hydrogen or any one of the alkali metals such as Na, Li, K and the like. And, as the chelating resin there are preferably used those having introduced especially an iminodiacetic acid group, an aminophosphoric acid group and the like in the same matrix as mentioned above, but in addition thereto there can be used those having introduced OH-type polyamine, $SO_4$-type pyridine groups and the like in the said matrixes.

These acidic cation exchange resins include Amberlite IR-120B, Amberlite IR-116, Amberlite IR-118, Amberlite IR-122, Amberlite IR-124, Amberlite IR-200C, Amberlite 252 (the abovementioned are products manufactured by Organo K.K.) and the like. And, as the chelating resins there can be enumerated Sumichelate MC-30 (produced by Sumitomo Kagaku K.K.), Dow XA-1 (produced by Dow Chemical Co.), Diaion (produced by Mitsubishi Kasei K.K.), Amberlite IRC-718 (produced by Organo K.K.), Sumikaion KA-850 (produced by Sumitomo Kagaku K.K.), Diaion CR-20 (produced by Mitsubishi Kasei K.K.), Duolite CS-346 (produced by Sumitomo Kagaku K.K.), Duolite ES-467 (produced by Sumitomo Kagaku K.K.), Sumichelate CR-2 (produced by Sumitomo Kagaku K.K.) and the like.

In view of the fact that plural kinds of ion-exchange resins are employed in the process of the present invention, it may be contemplated to purify the aqueous ink by providing plural ion-exchange resin packed tanks in series in accordance with the number of kinds of resins employed or by providing one tank in which plural kinds of ion-exchange resins are mixed. In operating the ion-exchange treatment of water soluble dyes with cation exchange resins, it is generally preferable to adopt a way to pass an aqueous dye solution or ink through an ion-exchange resin packed column as shown in the drawing, because a high purification efficiency can be thereby achieved.

In case the ion-exchange resin of cation type is employed and the ink containing at least one kind of dye selected from water soluble acid dyes and water soluble direct dyes is used, especially when the dye has, in its molecule, either of —$SO_3M$ and —COOM wherein M is an alkali metal such as Na, K, Li or the like, it is preferable that the metal represented by M of the acidic group of the cation exchange resin used is identical with that of the acidic group of the dye. If these metals are different from each other, there will sometimes be brought about undersirable results that the solubility of the dye in water is decreased due to the cation exchange treatment to thereby cause precipitation and thus the reliability of ink jet is rather deteriorated.

Generally speaking, jet recording inks (or water soluble dyes per se) contain metals such as Al, Cu, Fe, B, Be, Ca, Cd, Co, Cr, Mn, Ni, Pb, Si, Ti, Zn, Mg and the like or their metal oxides, in particular metals such as Al, Fe, Ca, Cr, Ni, Si, Zn and Mg or their metal oxides in abundance. The presence of these metals or their metal oxides in the ink is not desirable specifically in the points of hindering the long period preservation stability of the ink and further causing the ink to clog the nozzle. In the cases of conventional inks, the quantities of said metals and/or metal oxides contained therein are normally about 100 ppm, and about 20–30 ppm in less cases. As previously stated, said metals or metal oxides are very likely to adhere onto ink drops being jetted through the narrow nozzle and flying in the air.

In the case of the ion exchange resin-treated ink according to the present invention, contrarily, the quantities of said metals and/or metal oxides contained therein are reduced markedly. Especially, the ink treated (or contacted) with cation exchange resin (in particular, the use of strong acid cation exchange resin is effective) and chelating resin is effective because the quantities of said harmful metals and/or metal oxides contained therein are reduced to be in the proximity of 10 ppm or less. Accordingly, it is preferable for the present invention to use the cation exchange resin and chelating resin as the ion exchange resin. Especially, the use of chelating resin is exceedingly effective for the present invention.

In the practice of the process according to the present invention, it is desirable to provide plural filters with different meshes within the ink circulating system, and at that time it is preferable that the ink should be treated with the ion exchange resin at least in the former stage where the ink passes through a minimum-mesh filter. The reason is that as the ink having passed through this minimum-mesh filter is discharged or jetted through the narrow nozzle 1, it is necessary to remove impurities from the ink as much as possible by means of the ion exchange resin packed tank 5 or 6 in advance of said jetting. Employement of this step is further profitable in point of preventing filters from clogging.

As is evident from the above, the process according to the present invention permits to effect long-run continuous ink jet recording because the aqueous ink returned to the ink jet head 1 through the ink circulating system does not contain impurities and consequently the narrow nozzle portion is entirely free from clogging. Although it is naturally presumed that the water content of the ink evaporates gradually over a long period of time and consequently the ink becomes concentrated, this may be dealt with by adopting the expedient of initially adding polyethylene glycol in the ink for the purpose of suppressing the evaporation of the water to the utmost or of adding distilled water, ion exchange water or the like as the occasion may demand at desired places in the ink circulating system.

As can be readily understood from the previous explanation, the ink used in the process according to the present invention will be more preferable if it is treated initially with said ion exchange resin. And, as a matter of course the ink used in the process according to the present invention does contain no chelating reagent.

EXAMPLES

EXAMPLE 1

C.I. Direct Black 19: 2.0% by weight
Polyethylene glycol: 20.0% by weight
Sodium 2-pyridinethiol-1-oxide: 0.2% by weight
Ion exchange water: 77.8% by weight An aqueous ink was prepared by stirring a mixture of the above recipe fully while heating to 70° C., cooling it to room temperature, and thereafter filtering it twice through a 0.2 μm-mesh filter.

The apparatus as illustrated in FIG. 1 was employed. Further, the abovementioned aqueous ink was employed and as the ion exchange resin there was employed Amberlite IR-120B (sodium polystyrene sulfonate-type geled strong acid cation exchange resin: produced by Organo K.K.) in the cartridge form as shown in FIG. 2. The cartridge of ion-exchange resin was used at location 5 in FIG. 1. The mesh of the filters was about 40.0 μm in filter (6), about 10.0 μm in filter (8), about 2.0 μm in filter (11) and about 10.0 μm in filter (13).

Ink jet recording was carried out by means of a pilot printer illustrated in FIG. 1 using a nozzle of about 30 μm to find that a clear-cut image was obtained on a high quality paper even when recording had been continued for 1000 hours.

In succession, the aqueous ink was taken out at a middle place between the filter 13 and the narrow nozzle 103 of the apparatus as shown in FIG. 1, and this ink was divided into three parts. The respective parts were packed in glass containers, sealed up and stored at −20° C. for 6 months, at 4° C. for 6 months and at 15°–25° C. for 1 year to find that each part did neither cause any precipitation nor exhibit any change in the physical property and color tone of the ink.

The three-divided ink parts were again mixed together. The same ink jet recording as mentioned above was carried out using this ink to find that continuously stable jetting was attainable even when jetting had been continued for 1000 hours and a clearcut image was recorded on a high quality paper, too.

For comparison's sake, ink jet recording was carried out according to the exactly same procedure as mentioned above except that the above ion exchange resin cartridge was not employed to find that a clear-cut printing was hampered owing to clogging of the nozzle portion at the time when recording had been continued for 600 hours.

EXAMPLE 2

Ink jet recording was carried out in accordance with the exactly same procedure as Example 1 except that Amberlite IRC-718 (Na-type chelating resin comprising introducing an iminodiacetic acid group to a matrix: produced by Organo K.K.) was employed in place of the previously used Amberlite IR-120B to find that continuously stable jetting was obtainable even when jetting had been continued for 1500 hours and a clear-cut image was recorded on a high quality paper.

In succession, the ink was taken out in the same manner as Example 1, divided into three parts, packed in three glass containers and sealed up respectively. Then, they were stored at −20° C. for 8 months, at 4° C. for 8 months and at 15°–25° C. for 18 months to find that each part did neither cause any precipitation nor exhibit any change in the physical property and color tone of the ink.

The three divided ink parts were again mixed together and the same ink jet recording as mentioned above was carried out using this ink to find that continuously stable jetting was obtainable even when jetting had been continued for 1500 hours and a clear-cut image was recorded on a high quality paper, too.

EXAMPLE 3

Ink jet recording test was carried out in accordance with the exactly same procedure as Example 2 except that Sumichelate MC-30 (Na-type chelating resin comprising introducing an iminodiacetic acid group to a styrene-type matrix: produced by Sumitomo Kagaku K.K.) was employed in place of the previously used Amberlite IRC-718. The obtained effects were observed to be in the substantially same degree as Example 2.

EXAMPLE 4

Ink jet recording test was carried out in accordance with the exactly same procedure as Example 2 except that Diaion CR-10 (Na-type chelating resin comprising introducing an iminodiacetic acid group to a styrene-divinylbenzene copolymer type matrix: produced by Mitsubishi Kasei K.K.) was employed in place of the previously used Amberlite IRC-718. The obtained effects were observed to be in the substantially same degree as Example 2.

EXAMPLE 5

Ink jet recording test was carried out in accordance with the exactly same procedure as Example 2 except that Duolite ES-467 (Na-type chelating resin comprising introducing an aminophosphoric acid group to a styrene type matrix: produced by Sumitomo Kagaku K.K.) was employed in place of the previously used Amberlite IRC-178. The obtained effects were observed to be in the substantially same degree as Example 2.

EXAMPLE 6

Ink jet recording test was carried out in accordance with the exactly same procedure as Example 1 except that the dye was replaced by C.I. Direct Black 154. The obtained effects were observed to be in the same degree as Example 1.

EXAMPLE 7

Ink jet recording test was carried out in accordance with the exactly same procedure as Example 2 except that the dye was replaced by C.I. Direct Black 154. The obtained effects were observed to be in the same degree as Example 2.

What is claimed is:

1. In an ink jet printing process in which droplets of an aqueous ink are emitted from a nozzle, some of said droplets of said aqueous ink are deposited on a recording medium to record visible symbols thereon and the unused droplets of said aqueous ink are collected to form a stream and the stream of said aqueous ink is recirculated through a recirculation system and thence is fed to said nozzle for reuse, the improvement which comprises: in said recirculation system, flowing said stream of said aqueous ink in contact with an ion-exchange resin effective to remove dissolved metals and metal oxides from said stream of said aqueous ink.

2. A process as claimed in claim 1 wherein said aqueous ink contains at least one dye selected from the group consisting of water soluble acid dyes and water soluble direct dyes.

3. A process as claimed in claim 1 in which in said recirculation system, said stream of said aqueous ink is flowed in series through a plurality of tanks, each of said tanks being packed with a different ion-exchange resin.

4. A process as claimed in claim 1 in which in said recirculation system, said stream of said aqueous ink is flowed through a single tank which is packed with a mixture of different ion-exchange resins.

5. A process as claimed in claim 1 in which said stream of said aqueous ink contains 10 ppm or less of metals and metal oxides after it has contacted said ion-exchange resin.

6. A process as claimed in claim 1 wherein said ion-exchange resin is selected from the group consisting of acidic cation exchange resins, chelating resins and both of said acidic cation exchange resins and said chelating resins.

7. A process as claimed in claim 6 wherein said cation exchange resin contains a sulfonic acid group ($-SO_3M_1$), a carboxyl group ($-COOM_1$), a phenolic hydroxyl group ($-OM_1$), a phosphonic acid group ($-PO_3H_2$) or an arsonic acid group ($-AsO_3H_2$) wherein $M_1$ is hydrogen Na, Li or K, in a phenol-type, styrene-type, acryl-type, acrylic acid-type or pyridine-type matrix.

8. A process as claimed in claim 6 wherein said chelating resin contains an iminodiacetic acid group, aminophosphoric acid group, OH-type polyamine group or $SO_4$ -type pyridine group in a phenol-type, styrene-type, acryl-type, acrylic acid-type or pyridine-type matrix.

9. A process as claimed in claim 1 wherein said aqueous ink is contacted with said ion-exchange resin by flowing said aqueous ink through a column packed with an ion-exchange resin.

10. A process as claimed in claim 9 in which said unused droplets are collected in a collector device and said stream of said aqueous ink is fed directly from said collector device through said column.

11. A process as claimed in claim 10 in which after said stream of said aqueous ink is discharged from said column, it is flowed through at least one filtration device before it is fed to said nozzle for reuse.

12. A process as claimed in claim 10 in which after said stream of said aqueous ink is discharged from said column, it is fed through a first filtration device having a 3–20 μm mesh filter element, then is pressurized by a pump, then is fed through a second filtration device having a 0.1–2 μm mesh filter element, then through a third filtration device having a 1–20 μm mesh filter element and then is fed to said nozzle.

13. A process as claimed in claim 9 in which said unused droplets are collected in a collector device and said stream of said aqueous ink is fed directly from said collector device through a first filtration device having a 20 -200 μm filter element and thence through said column.

14. A process as claimed in claim 13 in which after said stream of said aqueous ink is discharged from said column, it is flowed through at least one additional filtration device before it is fed to said nozzle for reuse.

15. A process as claimed in claim 13 in which after said stream of said aqueous ink is discharged from said column, it is fed through a second filtration device having a 3–20 μm mesh filter element, then is pressurized by a pump, then is fed through a third filtration device having a 0.1–2 μm mesh filter element, then through a fourth filtration device having a 1–20 μm mesh filter element and then is fed to said nozzle.

* * * * *